(12) United States Patent
Kim et al.

(10) Patent No.: US 11,796,098 B2
(45) Date of Patent: Oct. 24, 2023

(54) HOSE CONNECTION MODULE FOR WATER TREATMENT DEVICE

(71) Applicants: LG ELECTRONICS INC., Seoul (KR); CHEONGHOSYSTEM CO.LTD., Gyeongsangnam-do (KR)

(72) Inventors: Youngjae Kim, Seoul (KR); Gyeonghwan Kweon, Seoul (KR); Sejoong Kim, Seoul (KR); Yong Woon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 563 days.

(21) Appl. No.: 16/440,023

(22) Filed: Jun. 13, 2019

(65) Prior Publication Data

US 2020/0011464 A1 Jan. 9, 2020

(30) Foreign Application Priority Data

Jul. 6, 2018 (KR) .......................... 10-2018-0078660

(51) Int. Cl.
*F16L 33/22* (2006.01)

(52) U.S. Cl.
CPC .................................. *F16L 33/225* (2013.01)

(58) Field of Classification Search
CPC .............................. F16L 33/225; F16L 33/22
USPC ................................. 285/179, 239, 242, 256
See application file for complete search history.

(56) References Cited

U.S. PATENT DOCUMENTS

| 2,179,200 | A | * | 11/1939 | Scholtes | F16L 33/222 285/250 |
| 3,951,438 | A | * | 4/1976 | Scales | F16L 33/2075 285/55 |
| 4,805,942 | A | * | 2/1989 | Goodridge | F16L 33/01 285/179 |
| 5,275,447 | A | * | 1/1994 | McNab | F16L 33/22 285/423 |
| 6,749,233 | B2 | * | 6/2004 | Ohya | F16L 13/146 285/243 |

(Continued)

FOREIGN PATENT DOCUMENTS

| DE | 19841155 | C1 | * | 1/2000 | ............ F16L 13/146 |
| DE | 202017106289 | U1 | * | 10/2017 | ............ F16L 13/146 |

(Continued)

OTHER PUBLICATIONS

Korean Office Action dated Nov. 19, 2019 issued in KR Application No. 10-2018-0078660.

*Primary Examiner* — Matthew Troutman
*Assistant Examiner* — Fannie C Kee
(74) *Attorney, Agent, or Firm* — KED & ASSOCIATES, LLP

(57) ABSTRACT

A hose connection module including a connector having a first side configured to receive liquid and a second side opposite the first side, wherein a plurality of ring-shaped fixing protrusions are formed on an outer circumferential surface of the second side and are spaced apart from each other in a flow direction of liquid, an ejection hose formed of an elastic material and configured to surround the outer circumferential surface of the second side of the connector, and a hollow fixing cap configured to press the water ejection hose from the outside of the ejection hose.

11 Claims, 8 Drawing Sheets

(56) References Cited

U.S. PATENT DOCUMENTS

| | | | |
|---|---|---|---|
| 8,647,300 B2* | 2/2014 | Kunzler | A61M 39/1011 |
| | | | 604/110 |
| 2014/0144410 A1* | 5/2014 | Barthel | F16L 33/225 |
| | | | 123/469 |
| 2016/0327189 A1* | 11/2016 | Schroeder | F16L 13/146 |
| 2020/0284379 A1* | 9/2020 | You | F16L 33/22 |

FOREIGN PATENT DOCUMENTS

| | | | |
|---|---|---|---|
| JP | 08326974 A * | 12/1996 | F16L 13/146 |
| KR | 20-0469264 | 10/2013 | |
| KR | 10-2018-0031328 | 3/2018 | |

* cited by examiner

HOSE CONNECTION MODULE FOR WATER TREATMENT DEVICE

CROSS-REFERENCE TO RELATED APPLICATION(S)

This application claims the benefit of the Korean Patent Application No. 10-2018-0078660 filed in Korea on Jul. 6, 2018, which is hereby incorporated by reference as if fully set forth herein.

BACKGROUND

1. Field

A hose connection module for a water treatment device is disclosed herein.

2. Background

A water or liquid treatment device such as a water purifier or a refrigerator may filter water supplied from a water source by a physical or chemical method to remove impurities and then supply impurity-removed water. The water treatment device may be classified into a natural filtration type, a direct filtration type, an ion exchange resin type, a distillation type, or a reverse osmosis type according to a water purification principle or system. Further, the water treatment device, as a mechanism for removing impurities by filtering water, is widely used for households.

In the case of a household water treatment device, the water treatment device may be connected to a water supply service and may remove floating or harmful components contained in tap water using a filter so as to dispense the treated tap water. Such various products of water treatment devices allowing hot water and cold water, as well as purified water, to be dispensed have been released. In recent years, compact water treatment devices which can be installed in various installation environments have been developed.

In addition, the related art water treatment devices use a combination of several filters to improve filtering power, and raw water is purified by stages through several filters and subsequently ejected to the outside. As described above, in order to connect a plurality of filters, both ends of a connection hose may be connected to an inlet and an outlet of each filter, and when the respective filters are connected by the connection hose as described above, a single water purification line is formed. Here, the filters and the connection hose may be fastened using a separate assembly member.

In the related art case, in order to tightly connect a filter head and the connection hose, a nipple or fitting structure is used to connect the filter head and the connection hose. However, since a structure of the assembly member is complicated and the number of components for assembling is increased, manufacturing cost is increased and price competitiveness is low in the field of industry, and in addition, the increase in the number of components degrades workability of filter assembly.

Particularly, a housing of the filters may be formed of a synthetic resin, while, in the case of a material of the assembly member, a method of assembling a metal nipple or a separate part to the filter heads and connecting the connection hose thereto is used to prevent water leakage by tightly connecting the connection hose. In this case, it is necessary to precisely machine parts in order to couple the metal parts to the filter body formed of a synthetic resin and there is a possibility that leakage points may be caused due to fastening of different materials.

BRIEF DESCRIPTION OF THE DRAWINGS

Embodiments will be described in detail with reference to the following drawings in which like reference numerals refer to like elements, and wherein.

DETAILED DESCRIPTION

Figure 1:
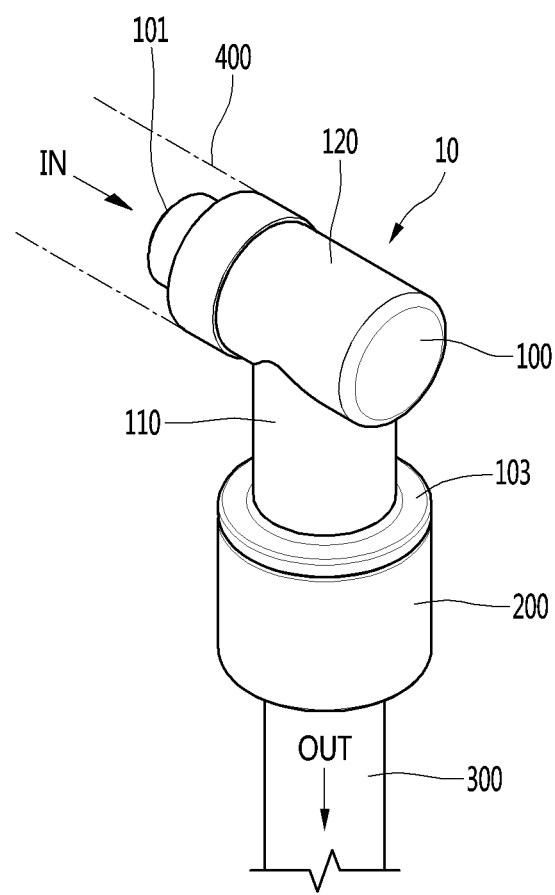
FIG. 1 is a perspective view of a hose connection module for a water treatment device according to an embodiment of the present disclosure.

Hereinafter, embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present invention.

Figure 2:
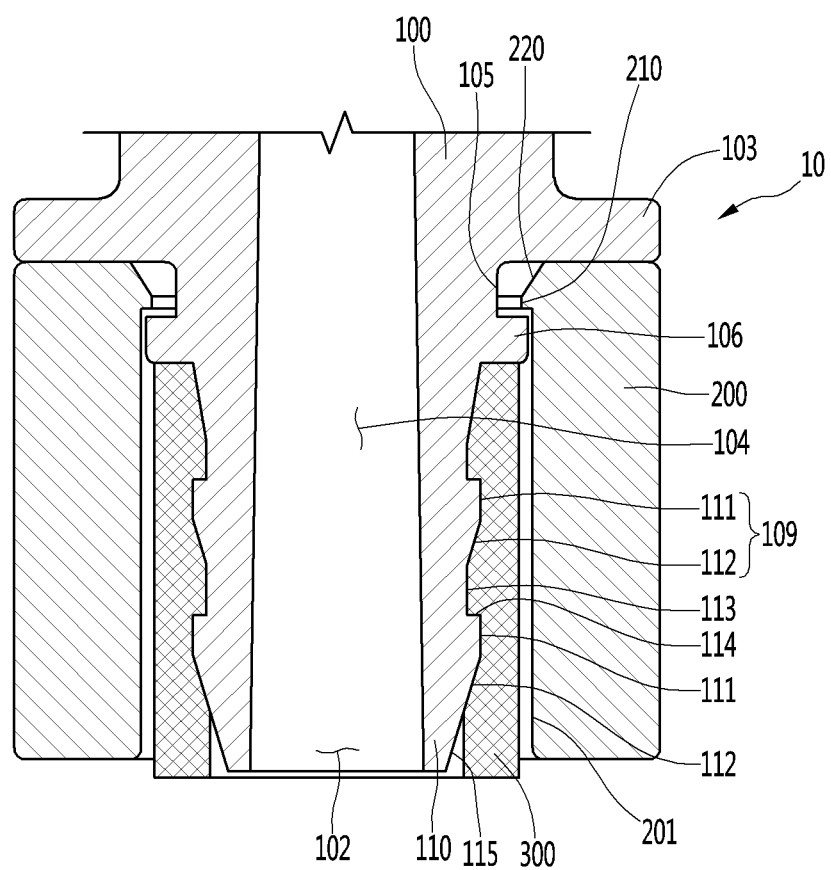
FIG. 2 is a cross-sectional view showing a state in which a connector, a hose, and a fixing cap are assembled in FIG. 1.
Figure 3:
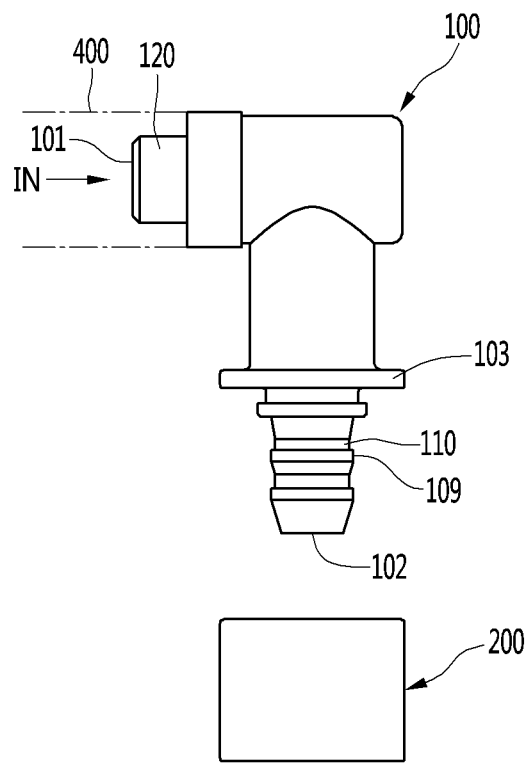
FIG. 3 is an exploded perspective view of a hose connection module for a water treatment device according to an embodiment.
Figure 3:
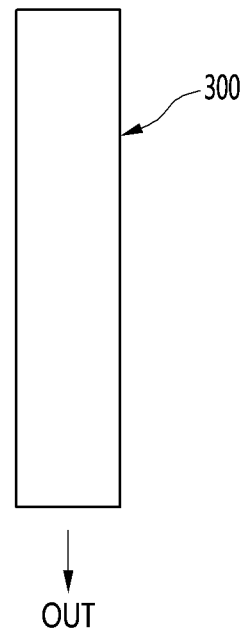

Referring to FIGS. 1 to 3, the hose connection module according to the present disclosure may be applied to various water or liquid treatment devices such as a water purifier and a refrigerator having a water purification function. The water treatment device may include a main body (housing) having a filter module including at least one filter therein to purify raw water supplied from the outside, and subsequently supplying purified water, and a water ejection module at least partially exposed to the outside of the main body (housing) and having a water ejection nozzle supplying the purified water generated in the main body to a user.

The water treatment device may include a plurality of filters. For example, the filter module may include a pre-carbon filter through which raw water passes first, a reverse osmosis filter (RO filter) through which the purified water, which has passed through the pre-carbon filter, passes secondly, and a post-carbon filter through which the purified water, which has passed through the RO filter, passes thirdly.

As another example, a hollow fiber membrane filter may be applied instead of the RO filter. As described above, the purified water, which has been purified through the plurality of filters, may be supplied to the outside of the main body (housing) through a water ejection hose and the water ejection nozzle. Here, the purified water having room temperature without being heated or cooled may be supplied to the water ejection nozzle, or the purified water may be heated to hot water, cooled to cold water, and then supplied to the water ejection nozzle.

The hose connection module 10 may be installed in the water treatment device described above and may connect the filter to another filter or connect the filter module and the water ejection module. Water passing through the filter at a front or first stage based on a flow of water may be transferred to a filter at a rear or second stage through the hose connection module 10, and water having passed through all the filters may be transferred to the water ejection nozzle side.

Hereinafter, the hose connection module 10 will be described in detail. The hose connection module 10 may include a connector 100 connected to an outlet of the filter, a water ejection hose 300 through which the purified water or liquid discharged from the connector 100 flows, and a fixing cap 200 covering one end portion of the water ejection hose 300 coupled to the connector 100 to maintain a coupling force of the water ejection hose 300 and the connector 100.

The connector 100 may have a shape in which both ends are opened. A flow path communicating with both open ends may be formed on an inner side. A first open end of the connector 100 may be connected to an outlet 400 of the filter so as to be supplied with purified water passing through the filter, and the introduced purified water may be discharged through a second open end.

A ring-shaped fixing protrusion 109 continuously protruding along the circumference of the connector 100 may be formed on an outer circumferential surface near the second open side of the connector, and here, the fixing protrusion 109 may be provided in plurality and spaced apart along a flow direction of purified water. A cross-section of the fixing protrusion 109 may have various shapes such as a circle, a rectangle, a triangle, a trapezoid, and the like. The fixing protrusion 109 may include a sloped surface 112 and a first planar surface 111 that protrudes further outward relative to a second planar surface 113 (to be described later).

The water ejection hose 300 may be formed of an elastic material or a flexible material such as rubber or silicon and may have a hollow tube shape. Also, a first end (upper side, see FIG. 3) of the water ejection hose 300 may surround an outer circumferential surface of the second open end of the connector 100, and a second end (lower side, see FIG. 3) of the water ejection hose 300 may be connected to the inlet of a neighboring filter or a water ejection module to transfer purified water passing through the connector 100 to the filter or the water ejection module.

The second open end of the connector 100 where the fixing protrusion 109 is formed may be forcibly inserted into the inside of the water ejection hose 300 and an inner diameter of the water ejection hose 300 may be expanded by the fixing protrusion 109, thus ensuring a coupling force of the connector 100 and the water ejection hose 300. The fixing protrusion 109 may be configured such that a thickness thereof is gradually expanded in a direction in which the fixing protrusion 109 is inserted into the water ejection hose 300, so that the fixing protrusion 109 may be easily inserted into the water ejection hose 300 but separation from the water ejection hose 300 may be difficult.

As described above, in order to prevent separation of the water ejection hose 300 and the connector 100 when the second open end of the connector 100 is press-fitted to the water ejection hose 300, a fixing cap (or fixing sleeve) 200 may be provided on an outer side of the water ejection hose 300. The fixing cap 200 may have the form of a hollow tube having a hollow 201 on an inner side thereof and may cover the water ejection hose 300 while pressing the water ejection hose 300 or the connector 100 from an outer side of the water ejection hose 300 so that the first end of the water ejection hose 300 is held against the second open end of the connector 100 and connected thereto in a press-fitted manner.

For example, the fixing cap 200 may be simply fixed to the connector 100 and may cover a connection portion of the water ejection hose 300 and the connector 100. For another example, the fixing cap 200 may be fixed to the connector 100 and at least a portion of the fixing cap 200 may cover the connection portion between the water ejection hose 300 and the connector 100, while pressing the water ejection hose 300. According to the configuration of the fixing cap 200, a fixing force of the water ejection hose 300 to the connector 100 may be further improved.

The plurality of fixing protrusions 109 may be formed near the second open end of the connector 100, and the water ejection hose 300 may be inserted over the plurality of fixing protrusions 109, and thus, the connector 100 and the water ejection hose 300 may be forcibly in contact with each other at a plurality of positions, and as a result, a fixing force of the water ejection hose 300 and the connector 100 may be improved. Further, when purified water is ejected from the connector 100 to the water ejection hose 300, it may be possible to prevent water leakage due to water pressure. Also, when purified water is ejected from the connector 100 to the water ejection hose 300, it may also be possible to prevent the water ejection hose 300 from being detached from the connector 100 due to the water pressure.

The fixing cap 200 may be formed of a transparent material. As described above, when the fixing cap 200 is formed of a transparent material, whether the water ejection hose 300 and the connector 100 are coupled may be recognized from the outside and whether water is leaked may be determined.

When the fixing cap 200 is fitted into the connector 100 or the water ejection hose 300, the fixing cap 200 may be fitted while checking a position of a fastening portion with the naked eyes, and thus, workability may be improved. In addition, an inner diameter of at least a portion of the fixing cap 200 may be smaller than an outer diameter of the water ejection hose 300.

When the inner diameter of a portion of the fixing cap 200 is formed smaller than the outer diameter of the water ejection hose 300 as described above, the water ejection hose 300 may be pressed radially inward by the fixing cap 200, and as a result, a fastening force of the water ejection hose 300 and the connector 100 may be enhanced.

The connector 100 may include an inflow portion 120 having an inlet 101 configured to receive purified water and a discharge portion (or stem or hose barb) 110 having an outlet 102 configured to discharge purified water. The connector 100 may include a passage 104 that allows liquid (i.e., water) to pass from the inlet 101 to the outlet 102. The discharge portion 110 may include a flange 103 formed along an outer circumference thereof, and the fixing protrusion 109 may be formed between the flange 103 and the outlet 102.

The inflow portion 120 and the discharge portion 110 may be linear. Alternatively, the inflow portion 120 and the discharge portion 110 may be curved. The connector 100 may further have a bent shape, and the inflow portion 120 and the discharge portion 110 may be perpendicular to each other.

As another example, the connector 100 may have a bent shape, and the inflow portion 120 and the discharge portion 110 may have an obtuse angle as an angle of inclination. For example, the inflow portion 120 of the connector 100 may be formed in a horizontal direction, and the discharge portion 110 of the connector 100 may be formed in a vertical direction.

An outlet 400 of the filter may be formed in a horizontal direction, and an inlet of the filter may be formed in a vertical direction. Accordingly, purified water discharged in the horizontal direction from the filter, while passing through the connector, may be changed in a flow direction to the vertical direction and may subsequently flow in the vertical direction, and purified water discharged from the connector 100 in the vertical direction may be supplied to another filter in the vertical direction.

Figure 4:
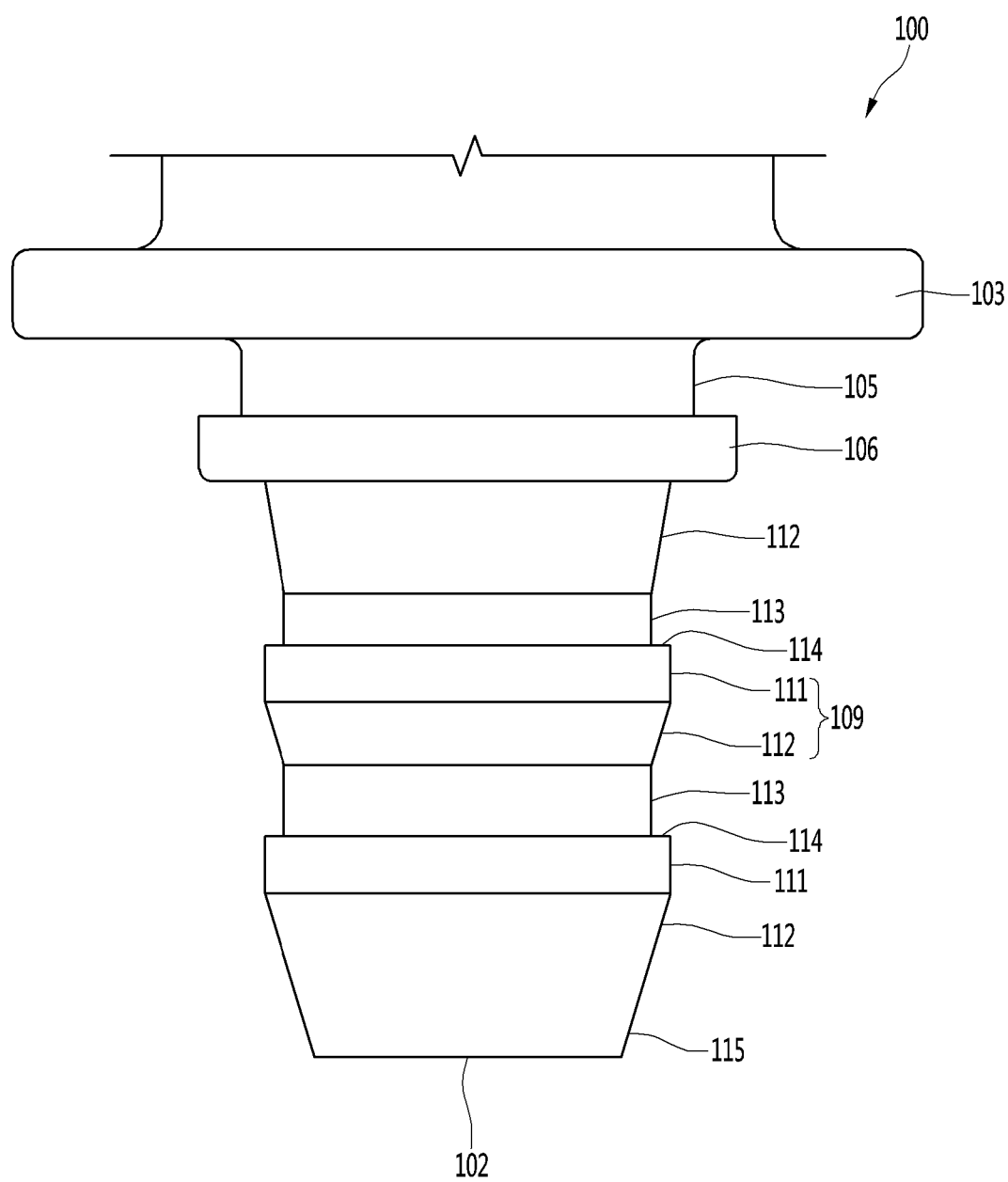
FIG. 4 is an enlarged view showing a portion of a connector of FIG. 3.
Figure 5:
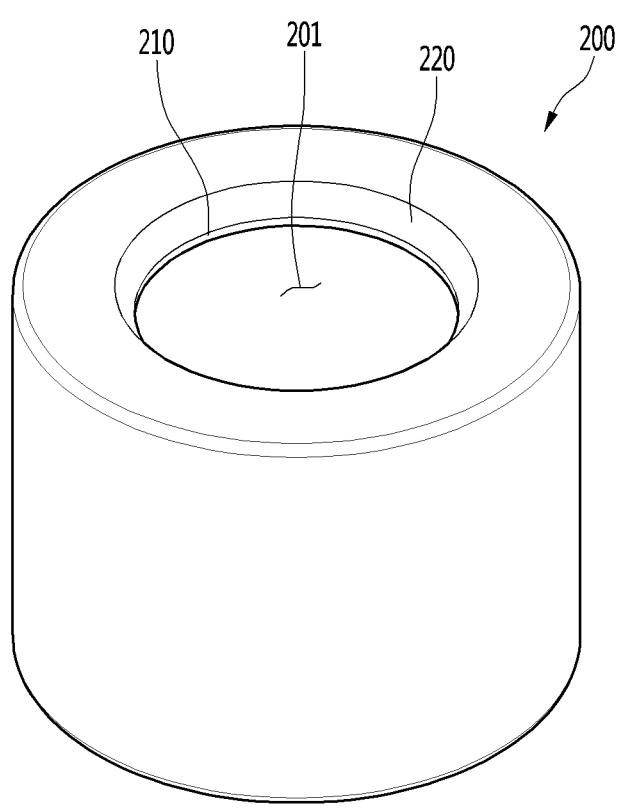
FIG. 5 is a perspective view showing a fixing cap of FIG. 3.

Referring to FIGS. 4 to 5, in the connector 100, an accommodating recess 105 which is concave radially inward may be formed along an outer circumferential surface on a lower side (lower side FIG. 4) of a flange 103, and an engagement protrusion or lip 210 configured to be inserted into the accommodation recess 105 may be formed along an inner circumferential surface at a first side (upper side, see FIG. 5) of the fixing cap 200. Here, in order to define the accommodation recess 105, an auxiliary flange 106 having an outer diameter smaller than an outer diameter of the flange 103 may be formed at a lower side of the flange 103 in parallel to the flange 103 and spaced apart from the flange 103.

An upper end (see FIG. 2) of the fixing cap 200 may abut a lower end (see FIG. 2) of the flange 103. A maximum rising position of the fixing cap 200 may be restricted by the flange 103 when the fixing cap 200 moves toward the flange 103. The flange 103 may serve as a stopper that limits the maximum rising height of the fixing cap 200.

The accommodation recess 105 may be formed continuously along the outer circumferential surface of the connector 100 and may have a ring shape. The engagement protrusion 210 may be formed continuously along the inner circumferential surface of the fixing cap 200 and may have a ring shape. In this case, when the upper end of the fixing cap 200 is positioned at the lower end of the flange 103, the engagement protrusion 210 may be accommodated within the accommodation recess 105.

Since the entire engagement protrusion 210 is inserted into the accommodation recess 105 with respect to the circumferential direction of the connector 100 and the fixing cap 200, a coupling force of the connector 100 and the fixing cap 200 may be ensured throughout the entire accommodation recess 105. The engagement protrusion 210 may have a sloped portion or counter sink 220 whose inner diameter is gradually narrowed from the outer side (upper side, see FIG. 5) to the inner side (lower side, see FIG. 5).

With the sloped portion 220 formed as described above, when the engagement protrusion 210 is inserted into the accommodation recess 105, the engagement protrusion 210 may easily pass through the auxiliary flange 106. Also, when the engagement protrusion 210 is inserted into the accommodation recess 105, a lower end of the sloped portion 220 may be caught by the upper end of the auxiliary flange 106 and the fixing cap 200 may be firmly fixed to the connector 100.

While the fixing cap 200 moves toward the connector 100 so that the engagement protrusion 210 is inserted into the accommodation recess 105 as described above, an outer surface of the water ejection hose 300 may be pressed radially inward by the engagement protrusion 210 and the sloped portion 220, and as a result, the fixing protrusion 109 of the connector 100 may be reliably press-fit into the inner circumferential surface of the water ejection hose 300. The fixing protrusion 109 may include a sloped surface having a thickness that gradually increases in a direction from the second open end (lower side, see FIG. 4) of the connector 100 where the outlet is formed to the first planar surface 111 at which a thickness of one side of the sloped surface 112 is uniformly maintained, and a second planar surface 113 having a thickness smaller than a thickness of the first planar surface to form a step 114 between the first planar surface 111 and the second planar surface 113.

The fixing protrusions 109 may be continuously formed in sequence along the connector 100 toward the flange 103. The sloped surface 112, the first planar surface 111, and the second planar surface 113 may be repeatedly formed to create a plurality of fixing protrusions 109.

An outer diameter of the second open end (lower end, see FIG. 4) of the connector 100 where the outlet 102 is formed may be smaller than the inner diameter of the water ejection hose 300. Accordingly, the second open end of the connector 100 may be inserted more easily into the water ejection hose 300 when the connector 100 is first connected to the water ejection hose 300.

The inner diameter of the water ejection hose 300 may be larger than the outer diameter of the second open end 115 of the discharge portion 110 in which the discharge portion 110 is formed and smaller than the outer diameter of the first planar surface 111. When the discharge portion 110 of the connector 100 is inserted into the water ejection hose 300, the sloped surface 112 and the first planar surface 111 may be press-fit into the inner circumferential surface of the water ejection hose 300, enhancing a fixing force of the water ejection hose 300 and the connector 100.

The inner diameter of the water ejection hose 300 may be smaller than the outer diameter of the second planar surface 113. When the discharge portion 110 of the connector 100 is inserted into the water ejection hose 300, the second planar surface 113, as well as the sloped surface 112 and the first planar surface 111, may be press-fit into the inner circumferential surface of the water ejection hose 300, further enhancing the fixing force of the water ejection hose 300 and the connector 100.

The angle of inclination of the sloped surface 112 of the fixing protrusion 109 formed nearest to the second open end (lower side in FIG. 4) of the connector 100 in which the outlet 102 is formed may be greater than an angle of inclination of the sloped surface 112 of the fixing protrusions 109 formed nearer to the flange 103 (upper side, see FIG. 4). Thus, a pressing force applied to the water ejection hose 300 press-fitted into the fixing protrusion 109 formed nearest to the second open end (lower side, see FIG. 4) of the connector 100 may be greater than a pressing force applied to the water ejection hose 300 nearest to the flange 103, further enhancing a coupling force of the water ejection hose 300 and the connector 100.

If the pressing force applied to the water ejection hose 300 press-fitted into the fixing protrusion 109 formed nearest to the second open end (lower side, see FIG. 4) of the connector 100 is smaller than the pressing force applied to the water ejection hose 300 nearest to the flange 103, the coupling force of the water ejection hose 300 and the connector 100 may weaken and the water ejection hose 300 and the connector 100 may be arbitrarily separated.

Figure 6:
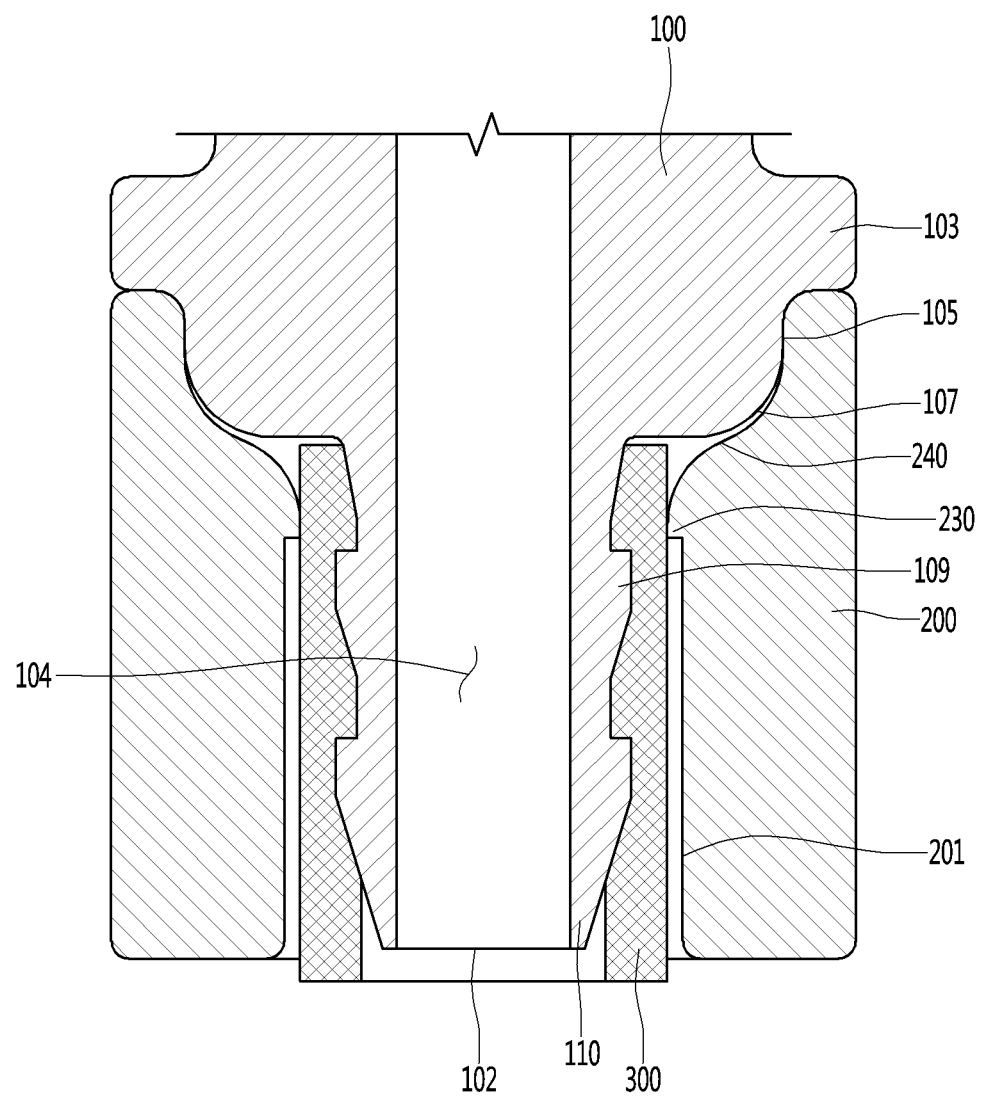
FIGS. 6 to 8 are cross-sectional views showing a state in which a connector, a hose, and a fixing cap are assembled according to another embodiment.
Figure 7:
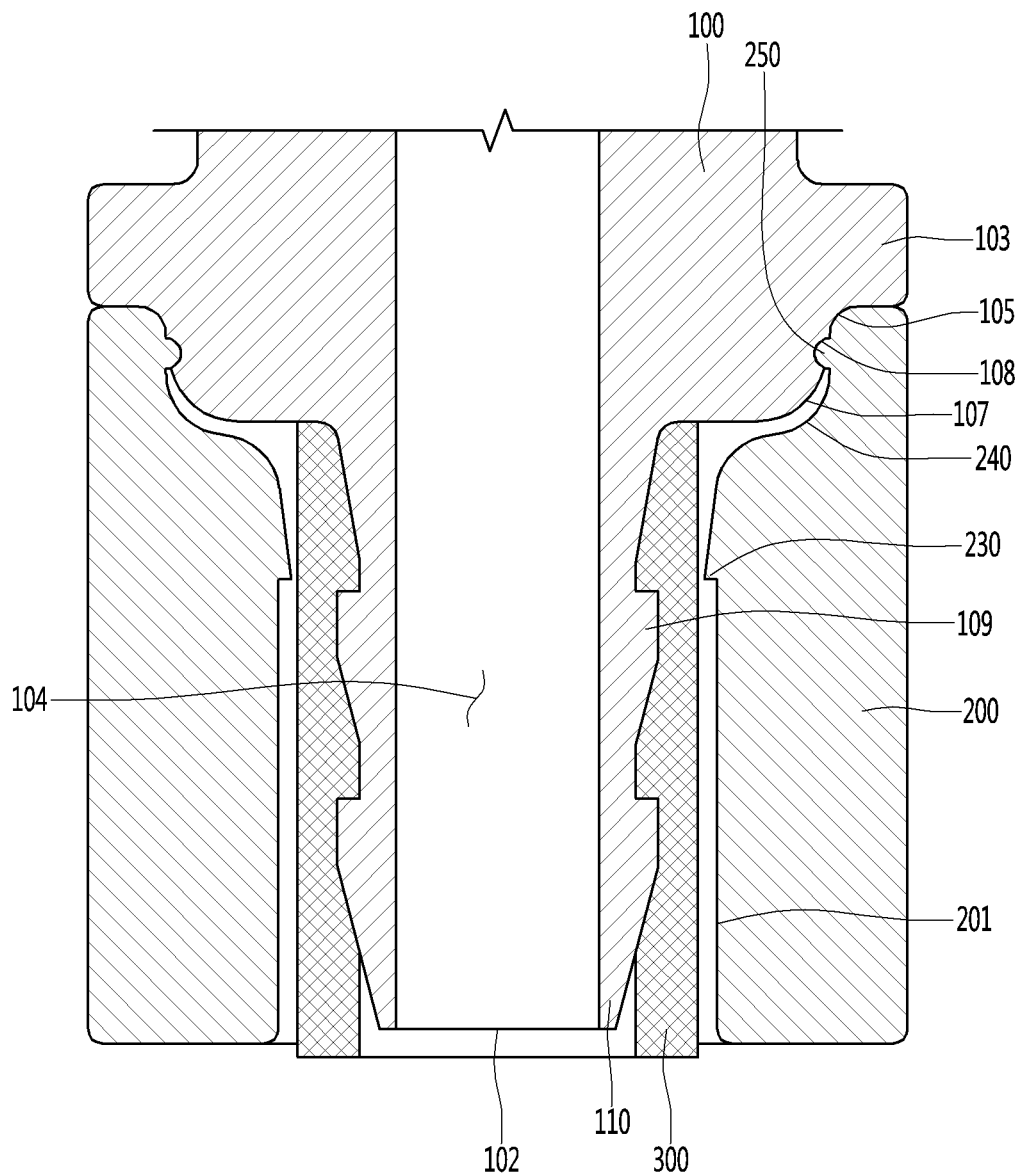
Figure 8:
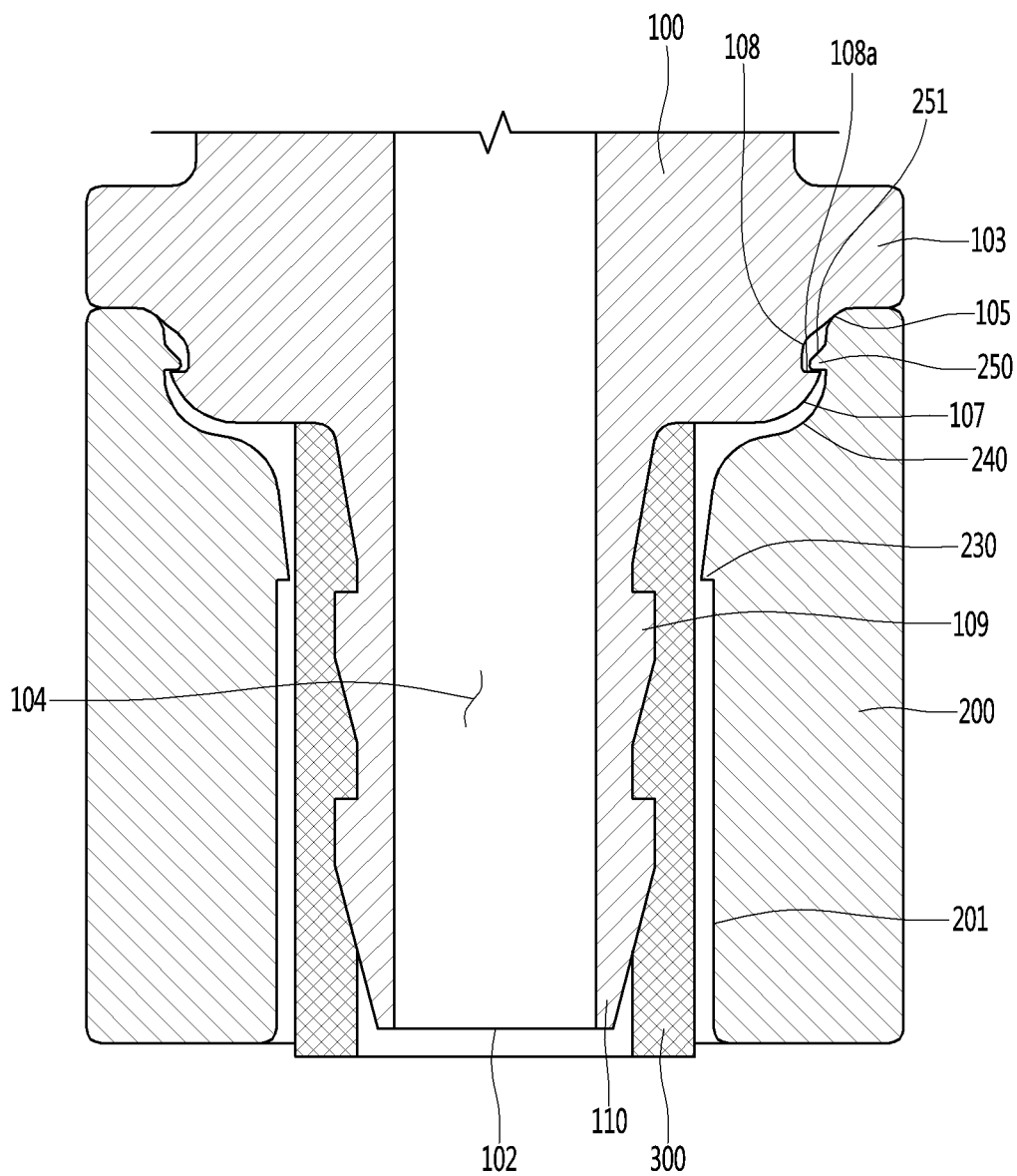

Referring to FIGS. 6 to 8, the fixing cap 200 may have a pressing protrusion (or pressing rib) 230 that protrudes inward from an inner circumferential surface of the fixing cap 200 to press the water ejection hose 300 inward. When the pressing protrusion 230 is formed on the inner side of the fixing cap 200 as described above, the water ejection hose 300 may be pressed inward by the pressing protrusion 230, and as a result, a fastening force of the water ejection hose 300 and the connector 100 may be improved in a state in which a portion of the connector 100 is inserted into the water ejection hose 300.

The inner diameter of the pressing protrusion 230 may be smaller than the outer diameter of the water ejection hose 300. When the inner diameter of the pressing protrusion 230 is smaller than the outer diameter of the water ejection hose 300 as described above, the outer surface of the water ejection hose 300 may be pressed inward by the pressing protrusion 230 while the fixing cap 200 is moved toward the connector 100, and as a result, the fixing protrusion 109 of the connector 100 may be pressed into the inner circumferential surface of the water ejection hose 300 more reliably.

The connector 100 may have an extending portion (or annular extension) 107 formed between the flange 103 and the fixing protrusion 109, having an outer diameter smaller than that of the flange 103 and a curved edge. The fixing cap 200 may also have a curved edge and an accommodation portion or groove 240 concave toward the annular extension to allow the annular extension 107 to be inserted therein. The annular extension 107 may have an outer diameter larger than the outer diameter of the fixing protrusion 109 and smaller than the outer diameter of the flange 103.

For example, the annular extension 107 may extend downward from the accommodation recess 105 (see FIG. 6). In this case, the auxiliary flange 106 may be omitted. The fixing cap 200 may have an accommodation portion 240 into which the extending portion 107 is inserted.

Therefore, when the fixing cap 200 is moved toward the connector 100 when the second open end of the connector 100 is inserted into the water ejection hose 300, the upper end of the fixing cap 200 may contact the lower end of the flange 103 and movement of the fixing cap 200 may be restricted. At least a portion of the extending portion 107 in which at least a portion thereof is curved may be inserted into the accommodation portion 240 in which at least a portion thereof is curved.

In the process of moving the fixing cap 200 toward the connector 100, an outer surface of the water ejection hose 300 may be pressed inward by the pressing protrusion 230 and the upper end of the fixing cap 200 may be in contact with the lower end of the flange 103 to limit movement of the fixing cap 200. The water ejection hose 300 may then be continuously pressed in a radial direction toward the internal fixing protrusion 109 by the pressing protrusion 230.

The annular extension 107 may have an insertion recess 108 formed to be concave inward in a radial direction along a circumference of the annular extension and the accommodation portion 240 may have an insertion protrusion 250 protruding inward in the radial direction and configured to be inserted into the insertion recess 108. When the insertion protrusion 250 and the insertion recess 108 are formed, since the insertion protrusion 250 is inserted into the insertion recess 108 along the entire circumference, a coupling force of the connector 100 and the fixing cap may be ensured.

For example, as illustrated in FIG. 7, the insertion recess 108 and the insertion protrusion 250 may have a semicircular cross-section. When the fixing cap 200 is fitted into the connector 100, the insertion protrusion 250 having a semicircular cross-section may be smoothly inserted along the curved surface into the insertion recess 108 having a semicircular cross section.

For another example, as illustrated in FIG. 8, the insertion recess 108 may have a step 108a at a lower end thereof and a lower end of the insertion protrusion 250 may have a planar surface, and a slope 251 may be formed to have thickness increasing from the upper side to the lower side in at least a portion thereof. When the fixing cap 200 is fitted into the connector 100, the insertion protrusion 250 may be relatively easily fitted into the insertion recess 108 due to the slope 251 of the insertion protrusion 250. Also, when the insertion protrusion 250 is inserted into the insertion recess 108, the planar surface of the lower end of the insertion protrusion 250 may be placed on the step 108a of the insertion recess 108, further enhancing a coupling force of the connector 100 and the fixing cap 200.

Since the plurality of fixing protrusions 109 are formed near the second open end of the connector 100 and the water ejection hose 300 is inserted over the plurality of fixing protrusions 109, the connector 100 and the water ejection hose 300 may be forcibly in contact with each other at a plurality of positions, and as a result, a fixing force of the water ejection hose 300 and the connector 100 may be improved. Further, when purified water is ejected from the connector 100 to the water ejection hose 300, water leakage that may occur due to water pressure may be prevented.

Also, when purified water or liquid is ejected from the connector 100 to the water ejection hose 300, separation of the water ejection hose 300 from the connector 100 due to water pressure may be prevented. Further, since the fixing cap 200 may be formed of a transparent material, whether the water ejection hose 300 and the connector 100 are coupled with each other may be recognized from the outside and water leakage may be checked, and when the fixing cap 200 is fitted into the connector 100 or the water ejection hose 300, the fixing cap 200 may be fitted while checking a position of a fastening portion with naked eyes, thereby improving workability.

Since the engagement protrusion 210 is inserted into the accommodation recess 105 over the entire circumference, a coupling force of the connector 100 and the fixing cap 200 may be ensured. Since the water ejection hose 300 is pressed radially inward around the entire circumference, a coupling force of the connector 100 and the fixing cap 200 may be ensured.

A hose connection module for a water treatment device may be capable of coupling a connector connecting a filter outlet and an inlet of a different filter or connecting a filter outlet and a water ejection nozzle and a connection hole.

A hose connection module for a water treatment device may be capable of enhancing airtightness by minimizing a possibility of water leakage that occurs due to a water pressure when purified water is ejected from a filter. A hose connection module for a water treatment device may be capable of ensuring safety by allowing a hose to be separated from a connector by a water pressure when purified water is ejected from a filter.

A hose connection module for a water treatment device to connect a filter to another filter or connect the filter to a water ejection nozzle may include: a connector having one side connected to an outlet of the filter to receive purified water passing through the filter and discharging purified water flowing in through the other open side, wherein a plurality of ring-shaped fixing protrusions protruding along the circumference of an outer circumferential surface of the other open side are formed to be spaced apart from each other in a flow direction of purified water; and a water ejection hose formed of an elastic material and having one side connected to surround the outer circumferential surface of the other open side of the connector and the other side connected to an inlet of a neighboring filter or connected to the water ejection module to deliver water ejected to the other open side of the connector.

The hose connection module may further include: a hollow fixing cap pressing the water ejection hose from the outside of the water ejection hose and covering the water ejection hose so that a state in which one side of the water ejection hose is connected to the connector, while surrounding the other side of the connector. The connector may include an inflow portion having an inlet receiving purified water and a discharge portion having an outlet discharging purified water, and the discharge portion has a flange formed along an outer circumference thereof and the fixing protrusion is formed between the flange and the outlet.

The fixing protrusion may include a sloped surface having a thickness gradually increasing from the other side where the outlet is formed to one side; a first planar surface in which a thickness of one side of the sloped surface is uniformly maintained; and a second planar surface having a thickness smaller than a thickness of the first planar surface to form a step with the first planar surface. According to the embodiment as described above, since the plurality of fixing protrusions are formed at the end portion of the connector and the water ejection hose is inserted into the plurality of fixing protrusions, the connector and the water ejection hose may be forcibly in contact with each other at a plurality of positions, and as a result, a fixing force of the water ejection hose and the connector may be improved.

Further, when purified water is ejected from the connector to the water ejection hose, water leakage that may occur due to water pressure may be prevented. Also, when purified water is ejected from the connector to the water ejection hose, separation of the water ejection hose from the connector due to water pressure may be prevented.

Further, since the fixing cap may be formed of a transparent material, whether the water ejection hose and the connector are coupled with each other may be recognized from the outside and water leakage may be checked, and when the fixing cap is fitted into the connector or the water ejection hose, the fixing cap may be fitted, while checking a position of a fastening portion with naked eyes, thereby improving workability.

When the engagement protrusion is inserted into the accommodation recess about the entire circumference, a coupling force of the connector and the fixing cap may be ensured. Since the water ejection hose is pressed inward along the entire circumference, a coupling force of the connector and the fixing cap may be ensured.

It will be apparent to those skilled in the art that various modifications and variations may be made in the present invention without departing from the spirit or scope of the disclosures. Thus, it is intended that the present invention covers the modifications and variations of this disclosure provided they come within the scope of the appended claims and their equivalents.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A hose connection module comprising:
a connector having a first end configured to receive liquid and a second end through which the liquid is discharged, wherein the second end includes a stem including a plurality of ring-shaped fixing protrusions that protrude from an outer circumferential surface of the stem and are spaced apart from each other in a flow direction of the liquid;
a hose formed of an elastic material and having a first end configured to surround the outer circumferential surface of the stem of the connector and a second end configured to dispense the liquid discharged from the second end of the connector; and
a hollow fixing sleeve configured to press the hose from an outside of the hose and cover the hose such that the hollow fixing sleeve surrounds the hose and the stem of the connector, and
wherein the connector includes an inflow section having an inlet configured to receive the liquid and a discharge section having an outlet configured to dispense the liquid, and
the discharge section has a flange formed along the outer circumference of the stem, and the plurality of fixing protrusions is formed between the flange and the outlet of the discharge section, and
wherein each of the plurality of fixing protrusions includes:
a sloped surface having a diameter that gradually decreases along the flow direction of the liquid;
a first circumferential surface at one end of the sloped surface, and the first circumferential surface to have a uniform diameter; and
a second circumferential surface to have a diameter smaller than the diameter of the first circumferential surface to form a step with the first circumferential surface,
wherein a first fixing protrusion is a nearest one of the plurality of fixing protrusions to the outlet, and a second fixing protrusion is a nearest one of the plurality of fixing protrusions to the flange, and a first angle of the sloped surface of the first fixing protrusion with respect to an axis of the stem is greater than a second angle of the sloped surface of the second fixing protrusion with respect to the axis of the stem, and
wherein an inner diameter of the hose is larger than an outer diameter of the second end of the discharge section in which the outlet is formed, and the inner diameter of the hose is smaller than an outer diameter of the first circumferential surface,
wherein an outer diameter of the second circumferential surface is smaller than the outer diameter of the first circumferential surface, and
wherein the inner diameter of the hose is smaller than the outer diameter of the second circumferential surface.

2. The hose connection module of claim 1, wherein the inflow section and the discharge section are perpendicular to each other.

3. The hose connection module of claim 1, wherein the connector includes an accommodation recess formed concave radially inward adjacent to the flange, and the hollow fixing sleeve includes an engagement lip configured to be inserted into the accommodation recess.

4. The hose connection module of claim 3, wherein the engagement lip has a sloped portion having an inner diameter that gradually reduces in a direction from the flange toward the outlet.

5. The hose connection module of claim 1, wherein the hollow fixing sleeve includes a pressing lip that protrudes radially inward to press the hose.

6. The hose connection module of claim 5, wherein the connector includes an annular extension formed between the flange and the plurality of fixing protrusions, the annular extension having an outer diameter smaller than an outer diameter of the flange and having a curved surface, and the hollow fixing sleeve includes an accommodation groove configured to accept the annular extension and having a curved surface.

7. The hose connection module of claim 6, wherein the annular extension includes an insertion recess formed to be concave radially inward along a circumferential direction, and the accommodation groove includes an insertion protrusion protruding radially inward along the circumferential direction so as to be inserted into the insertion recess.

8. The hose connection module of claim 7, wherein the insertion recess and the insertion protrusion each have a semicircular cross-section.

9. The hose connection module of claim 1, wherein the hollow fixing sleeve is formed of a transparent material.

10. The hose connection module of claim 1, wherein an inner diameter of at least a portion of the hollow fixing sleeve is smaller than an outer diameter of the hose.

11. The hose connection module of claim 1, wherein the hose connection module is configured to be installed in a water treatment apparatus including a main body and a filter module including at least one filter therein to purify raw water supplied from the outside, and subsequently supply the purified water to a water ejection module at least partially exposed to the outside of the main body and having a water ejection nozzle that supplies the purified water generated in the main body to a user, and wherein the hose connection module is further configured to connect the at least one filter to another filter or connect the filter module to the water ejection module.

* * * * *